United States Patent
Baerhle-Miller et al.

(10) Patent No.: US 11,987,225 B2
(45) Date of Patent: May 21, 2024

(54) DRIVER ASSISTANCE METHOD IN WHICH A VEHICLE PERFORMS A DRIVING MANOEUVRE AUTOMATICALLY, AND CLOSED-LOOP AND OPEN-LOOP CONTROL DEVICE FOR A BRAKING DEVICE OF A VEHICLE

(71) Applicant: Robert Bosch GmbH, Stuttgart (DE)

(72) Inventors: Frank Baerhle-Miller, Schoenaich (DE); Hubertus Wienken, Langenbrettach (DE)

(73) Assignee: Robert Bosch GmbH, Stuttgart (DE)

( * ) Notice: Subject to any disclaimer, the term of this patent is extended or adjusted under 35 U.S.C. 154(b) by 647 days.

(21) Appl. No.: 17/260,394

(22) PCT Filed: Jun. 5, 2019

(86) PCT No.: PCT/EP2019/064657
§ 371 (c)(1),
(2) Date: Jan. 14, 2021

(87) PCT Pub. No.: WO2020/015918
PCT Pub. Date: Jan. 23, 2020

(65) Prior Publication Data
US 2021/0261103 A1  Aug. 26, 2021

(30) Foreign Application Priority Data
Jul. 19, 2018  (DE) ............... 10 2018 212 064.1

(51) Int. Cl.
*B60T 7/12* (2006.01)
*B60T 8/171* (2006.01)
*B60T 8/72* (2006.01)

(52) U.S. Cl.
CPC ............... *B60T 7/12* (2013.01); *B60T 8/171* (2013.01); *B60T 8/72* (2013.01); *B60T 2201/03* (2013.01);
(Continued)

(58) Field of Classification Search
CPC ... B60T 7/12; B60T 8/171; B60T 8/72; B60T 2201/03; B60T 2230/08; B60T 2260/02
(Continued)

(56) References Cited

U.S. PATENT DOCUMENTS 3,958,671 A * 5/1976 Muller ............... B60T 1/087
188/274
5,865,513 A * 2/1999 Inagaki ............... B60T 8/1755
303/189
(Continued)

FOREIGN PATENT DOCUMENTS

CN 101032963 A 9/2007
CN 101898560 A 12/2010
(Continued)

OTHER PUBLICATIONS

Georg Mauer, A Fuzzy Logic Controller for an ABS Braking System, Nov. 1995, IEEE Transactions on Fuzzy Systems, vol. 3, No. 4 (Year: 1995).*
(Continued)

*Primary Examiner* — Elaine Gort
*Assistant Examiner* — Matthias S Weisfeld
(74) *Attorney, Agent, or Firm* — Maginot, Moore & Beck LLP

(57) ABSTRACT

The disclosure relates to a driver assistance method, in which a vehicle performs a driving manoeuvre automatically, and a braking device, in particular a parking brake, is at least partially actuated during the performance of the driving manoeuvre so that a braking action is constantly
(Continued)

exerted on the wheels of at least one axle so that a drive of the vehicle operates counter to the braking action of the braking device in order to move the vehicle. According to the disclosure, during the driving manoeuvre at least one operating parameter which is related to an undesired increase in the braking action exerted on at least one wheel is detected and evaluated, and a braking action on at least one wheel is reduced in accordance with the result of said evaluation.

8 Claims, 4 Drawing Sheets

(52) U.S. Cl.
CPC ....... *B60T 2230/08* (2013.01); *B60T 2260/02* (2013.01)
(58) Field of Classification Search
USPC .......................................................... 701/70
See application file for complete search history.

(56) References Cited

U.S. PATENT DOCUMENTS

| | | | | |
|---|---|---|---|---|
| 2009/0184572 A1* | 7/2009 | Yamada | ................ | B60T 8/1755 |
| | | | | 303/140 |
| 2011/0251762 A1* | 10/2011 | Uematsu | ............. | B60W 10/184 |
| | | | | 701/50 |
| 2014/0319902 A1* | 10/2014 | Benzler | ................. | B60T 13/662 |
| | | | | 303/6.01 |
| 2015/0035351 A1* | 2/2015 | Okano | .................... | B60T 13/12 |
| | | | | 303/10 |
| 2016/0194001 A1* | 7/2016 | Kelly | ................... | B60K 28/165 |
| | | | | 701/41 |
| 2017/0297452 A1* | 10/2017 | Cho | .......................... | B60L 7/18 |
| 2017/0297575 A1* | 10/2017 | Das | ....................... | B60W 10/02 |
| 2018/0281799 A1* | 10/2018 | Kawamoto | ............. | F02D 29/00 |

FOREIGN PATENT DOCUMENTS

| | | | | |
|---|---|---|---|---|
| CN | 104837695 A | | 8/2015 | |
| DE | 19837373 A1 | * | 2/2000 | ............. B60T 8/172 |
| DE | 10 2004 041 188 A1 | | 4/2005 | |
| DE | 10 2006 004 258 A1 | | 8/2007 | |
| DE | 10 2012 212 090 A1 | | 1/2014 | |
| DE | 10 2013 006 688 A1 | | 10/2014 | |
| DE | 102013006688 A1 | * | 10/2014 | ............. B60T 7/122 |
| DE | 10 2015 214 524 A1 | | 6/2016 | |
| DE | 10 2015 216 214 A1 | | 3/2017 | |
| EP | 1 564 096 A1 | | 8/2005 | |

OTHER PUBLICATIONS

International Search Report corresponding to PCT Application No. PCT/EP2019/064657, dated Aug. 20, 2019 (German and English language document) (5 pages).

\* cited by examiner

DRIVER ASSISTANCE METHOD IN WHICH A VEHICLE PERFORMS A DRIVING MANOEUVRE AUTOMATICALLY, AND CLOSED-LOOP AND OPEN-LOOP CONTROL DEVICE FOR A BRAKING DEVICE OF A VEHICLE

This application is a 35 U.S.C. § 371 National Stage Application of PCT/EP2019/064657, filed on Jun. 5, 2019, which claims the benefit of priority to Serial No. DE 10 2018 212 064.1 filed on Jul. 19, 2018 in Germany, the disclosures of which are incorporated herein by reference in their entirety.

BACKGROUND

The disclosure relates to a method for assisting a driver in which method a vehicle automatically carries out a driving maneuver, and to an open-loop and closed-loop control installation for a brake installation of a vehicle.

From DE 10 2012 212 090 A1, it is known for a braking effect by means of a parking brake to be exerted on the wheels of a vehicle while a driving maneuver of the vehicle is being carried out automatically, specifically during a parking procedure. It is ensured on account thereof that the vehicle can be held directly and securely even in the case of a malfunction, for example. From DE 2015 214 524 A1 as well as DE 10 2015 216 214 A1, it is also known for a parking brake to be kept permanently activated during a parking procedure that is carried out automatically, and to this extent autonomously.

SUMMARY

The problem on which the disclosure is based is achieved by a method as well as an open-loop and closed-loop control installation having the features of the disclosure.

One aspect of the disclosure relates to a method for assisting a driver, in which method a vehicle automatically, thus "fully autonomously", carries out a driving maneuver, for example a parking procedure. A brake installation, for example a parking brake of the vehicle, is at least partially activated while the driving maneuver is being carried out such that a braking effect is permanently exerted on the wheels of at least one axle. During the driving maneuver, a drive of the vehicle thus has to also operate at least counter to the braking effect of the braking installation in order for the vehicle to be able to be moved along a driving path.

It is proposed according to the disclosure that at least one operating parameter which is associated with an unintentional, thus not controlled or not consciously initiated, respectively, increase of the braking effect exerted on at least one wheel is detected and evaluated during the driving maneuver. A braking effect on at least one wheel, that wheel at which an unintentional increase of the braking effect has been established, is reduced as a function of the result of the evaluation.

The disclosure is based on the concept that the temperature of the brake installation can vary on account of a braking effect being permanently provided during the driving maneuver. For example, brake disks and brake pads of the brake installation can vary their temperature during the driving maneuver; this temperature can in particular increase by virtue of the prevailing friction. Such a driving maneuver herein, depending on its characteristics, can also take a comparatively long time, for example when parking in a parking garage. It is possible herein for the vehicle to first be temporarily parked at a transfer point and for the vehicle to then automatically and autonomously seek the final parking bay. The search for a parking bay can thus take several minutes. While driving, the vehicle is permanently braked such that the brake disks and the further components heat up.

In addition to the brake disks and brake pads, the temperatures can also vary, in particular increase, in the adjacent components (for example the brake fluid). On account of said effects, the brake torque and thus the braking effect that is exerted by the brake installation on the wheels during the driving maneuver can significantly vary, specifically increase or be amplified, respectively. This can impede the implementation of the driving maneuver.

By way of the method proposed here, it is ensured that the driving maneuver can also be continued or reliably carried out, respectively, even when individual or several components of the brake installation heat up during the driving maneuver and the braking effect exerted on the wheels during the driving maneuver is unintentionally increased on account thereof. The automatic "fully autonomous" implementation of the driving maneuver is facilitated or ensured, respectively, in this way. By means of the disclosure, it is specifically identified while carrying out the driving maneuver whether the braking effect exerted on the wheels is unintentionally increased. If it is established that there is such an unintentional increase of the braking effect, the brake installation is actuated such that the braking effect is reduced at least on that wheel where the unintentional increase has been established.

One potential design embodiment of the method provides that the operating parameter comprises a variable that characterizes a drive torque of the drive of the vehicle, and that the braking effect on the wheels of a driven axle is reduced when the variable characterizing the drive torque exceeds a threshold. This also includes that the braking effect on the wheels of a driven axle is reduced when a variation of the variable characterizing the drive torque exceeds a threshold.

This is based on the concept that a specific drive torque of the drive of the vehicle is required for moving the vehicle during a driving maneuver at a "normal" braking effect of the brake installation. Should the braking effect of the brake installation during the driving maneuver be unintentionally increased for the reasons mentioned above, the drive has to generate a higher drive torque in order to be able to continue moving the vehicle at a desired speed during the driving maneuver. This is detected according to the disclosure, and the drive torque is consequently reduced in a corresponding manner.

In one refinement to this end it is proposed that the braking effect on the wheels of a driven axle is reduced only when the threshold does not correlate with a longitudinal inclination of the vehicle during the driving maneuver. This is based on the concept that an increased drive torque during the driving maneuver can not only be caused by an unintentional increase of the braking effect but that such an increased drive torque can also be necessitated by an incline in the driving path of the vehicle during the driving maneuver. Such an incline in the driving path in turn manifests itself in a corresponding longitudinal inclination of the vehicle. The latter can be detected by corresponding sensors. According to the disclosure, the threshold of the variable characterizing the drive torque, beyond which threshold the braking effect is reduced, is correlated with the longitudinal inclination of the vehicle, said threshold thus being a function of the longitudinal inclination of the vehicle, or of the incline in the driving path.

Should the longitudinal inclination thus indicate a comparatively steep incline in the driving path, a comparatively high threshold is applied, whereas a comparatively low threshold is applied when the longitudinal inclination indicates a comparatively minor incline or even a flat driving path. According to the disclosure, a variation of the drive torque required during the driving maneuver can in particular be correlated with a variation of the incline established during the driving maneuver. Once it is detected that the drive torque increases despite the incline varying only insignificantly during the driving maneuver, the required increase of the drive torque is attributed to an unintentional increase of the braking effect, and the braking effect on the driven wheels is consequently at least partially reduced.

It is proposed herein that the correlation between the longitudinal inclination and the characterizing variable is determined at the beginning of the driving maneuver. This is based on the concept that the ratio between the required drive torque and a defined incline at the beginning of a driving maneuver can vary because a different load, a different brake temperature, or else different coefficients of friction by virtue of the previous history (fading, vitrification, contamination) may be present. The method is largely robust in relation to said external influences when the correlation is determined at the beginning of the driving maneuver.

One potential design embodiment of the method provides that the operating parameter comprises the wheel rotation speeds of the wheels of an axle, and that the braking effect on that wheel that has a lower wheel rotation speed than the other wheel is partially reduced at least when a difference between the wheel rotation speeds of the two wheels exceeds a threshold value. This variant of the method according to the disclosure can be implemented in a very simple manner. This variant herein is based on the concept that the unintentional increase of the braking effect in most instances arises in a non-symmetrical and identical manner at both wheels of an axle so that a difference between the wheel rotation speeds that lies above the threshold is an indication that one of the two wheels has a higher level of slippage. While a braking effect in a classic ABS is indeed likewise reduced based on a comparison of the wheel rotation speeds, the ABS is used for ensuring an ideally high braking effect and vehicle stability during a braking procedure. The present method is aimed at the exact opposite, specifically to ensure a continuation of the driving maneuver.

In one refinement to this end it is proposed that the threshold value for the difference is adapted as a function of a steering angle, in particular that the threshold value is higher in the case of a larger steering angle than in the case of a smaller steering angle. The reliability in terms of carrying out the method is enhanced on account thereof. This applies when the difference between the wheel rotation speeds is detected or evaluated, respectively, at a non-driven axle.

It is furthermore proposed that the threshold value for the difference is adapted as a function of the driving direction, in particular that, in a vehicle with front-wheel steering, the threshold value is higher when reversing than when traveling forward. This applies when the difference between the wheel rotation speeds is detected or evaluated, respectively, at a non-driven axle. The reliability in terms of carrying out the method is likewise enhanced on account thereof.

It is possible for the braking effect to be exerted on the wheels of a non-driven axle. Additionally or alternatively, however, it is also possible for the braking effect to be exerted on the wheels of a driven axle.

Another aspect of the disclosure relates to an open-loop and closed-loop control installation for a brake installation, in particular a parking brake, of a vehicle, having a processor and a memory, said open-loop and closed-loop control installation being configured such that the latter is configured for carrying out a method of the type described above.

Another aspect of the disclosure relates to a brake installation, in particular a parking brake, of a vehicle, said brake installation comprising an open-loop and closed-loop control installation of the type described above.

BRIEF DESCRIPTION OF THE DRAWINGS

Exemplary embodiments of the disclosure will be explained hereunder with reference to the appended drawing in which.

DETAILED DESCRIPTION

Components of equivalent function or regions in different embodiments hereunder are identified by different reference signs.

Figure 1:
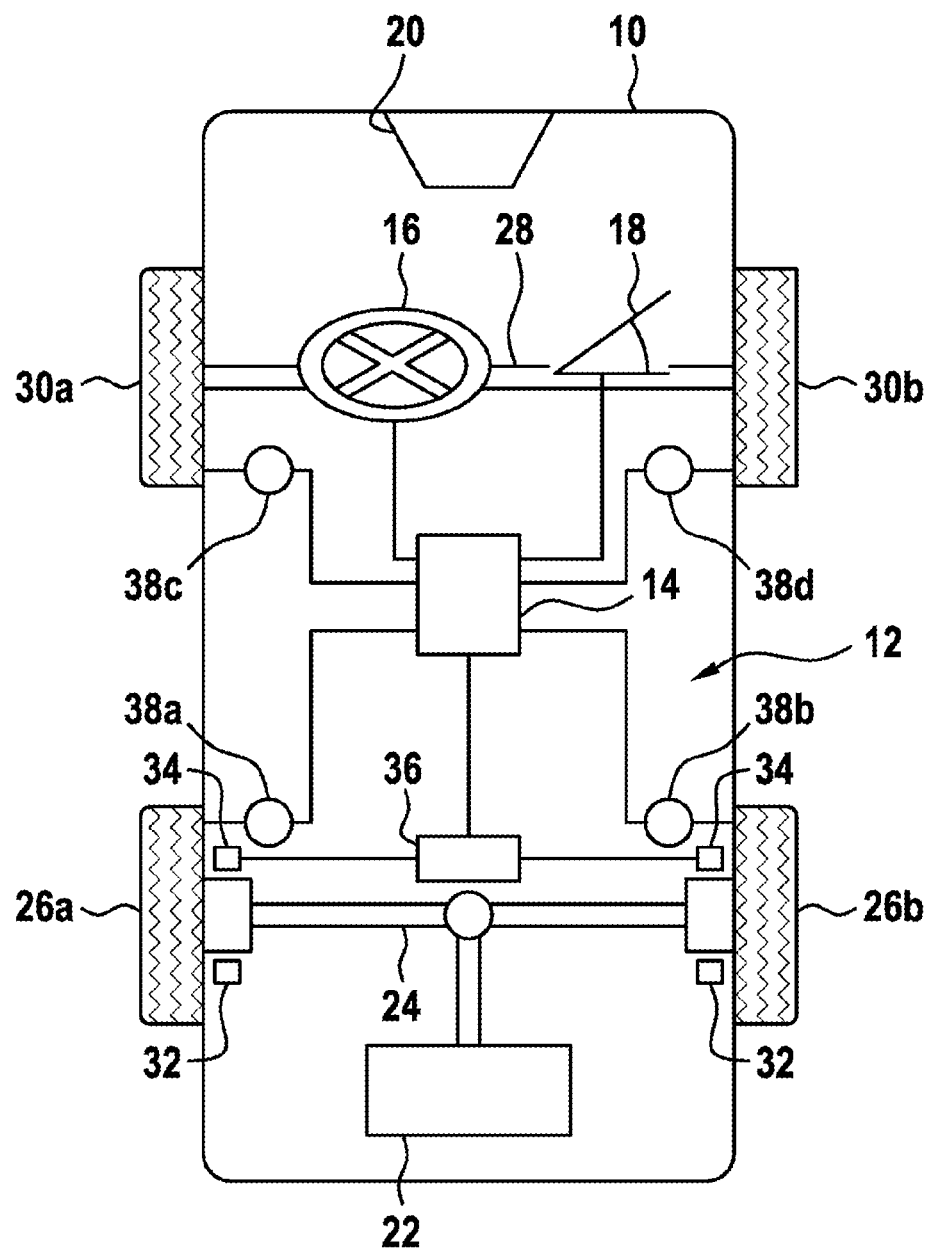
FIG. 1 shows a schematic plan view of a vehicle having a brake installation.

FIG. 1 shows a vehicle 10 which has a driver assistance system 12. The driver assistance system 12 comprises an open-loop and closed-loop control installation 14 having a processor and a memory (both not illustrated) and is specified such that the vehicle 10 can automatically and fully autonomously carry out a driving maneuver. In order to be able to assume the transverse guiding as well as the longitudinal guiding of the vehicle 10, the driver assistance system 12 possesses connections to further systems of the vehicle 10 by way of which the vehicle 10 can be steered, accelerated and/or decelerated. These connections in FIG. 1 are indicated by a schematic connection from the open-loop and closed-loop control installation 14 to a steering wheel 16 and an accelerator pedal 18. The driver assistance system 12 illustrated as the example in FIG. 1 furthermore possesses means so as to detect a state of the vehicle 10 relative to the environment. This also includes inter alia a sensor 20 by way of which a longitudinal inclination of the vehicle 10 can be determined and/or detected.

In order for the vehicle 10 to be driven, the vehicle 10 possesses a drive 22 which, in the example illustrated in FIG. 1, acts on a rear axle 24 and thus drives rear wheels 26*a* and 26*b* of the vehicle 10. The drive 22 can be an internal combustion engine and/or an electric motor, for example. A non-driven articulated front axle 28 having front wheels 30*a* and 30*b* also forms part of the vehicle 10.

In order for the vehicle 10 to be decelerated, said vehicle 10 possesses two mutually independent brake installations. In the normal driving operation of the vehicle 10, a service brake 32 is used, which acts on all wheels and is typically activated by way of a hydraulic system, or a brake pedal not illustrated, respectively (merely for reasons of simplicity, it is nevertheless illustrated in the drawing that the service brake 32 acts on the rear wheels 26a and 26b). The vehicle 10 moreover possesses a parking brake 34 which acts on the rear wheels 26a and 26b and by way of which the vehicle 10 is kept stationary, for example when said vehicle 10 is parked in a parking bay.

The parking brake 34 illustrated in FIG. 1 is electrically, for example electro-mechanically or electro-hydraulically, activated, wherein the driver assistance system 12, or the open-loop and closed-loop control installation 14, respectively, possesses means 36 by way of which the parking brake 34 can be actuated. Depending on the embodiment of the driver assistance system 12, these means 36 can also be integrated in the open-loop and closed-loop control installation 14, or said means 36 can also be part of a further assistance system of the vehicle 10 which is however not illustrated here. Sensors 38a-d, which are assigned to the rear wheels 26a and 26b as well as to the front wheels 30a and 30b and detect the rotation speeds of said wheels, furthermore form part of the vehicle 10. The sensors 38a-d are connected to the open-loop and closed-loop control installation 14.

The driver assistance system 12 is in particular configured for automatically carrying out a driving maneuver such that the vehicle 10 herein is operated in a fully autonomous manner. Such a driving maneuver can be parking, for example. When a driving maneuver is automatically carried out by the driver assistance system 12, it is thus provided during the driving maneuver that the parking brake 34 is at least partially activated by the driver assistance system 12. In order to nevertheless be able to move the vehicle 10, the drive 22 has to operate counter to the braking effect of the parking brake 34. Specific components of the parking brake 34 can heat up on account thereof, in particular when the driving maneuver takes a comparatively long time. Consequently, the braking effect which, in the present case, is exerted by the parking brake 34 on the rear wheels 26a and 26b can be unintentionally increased, thus not by way of any actuation, on account of which the movement of the vehicle during the driving maneuver may be impeded or even prevented.

In order for this to be prevented, a computer program, which can be executed on the processor of the open-loop and closed-loop control installation 14 and by way of which the described unintentional increase of the braking effect can at least be partially reversed, is stored in the memory of the open-loop and closed-loop control installation 14.

To this end, at least one operating parameter, which is associated with an unintentional increase of the braking effect exerted on at least one wheel 26a and 26b, is detected and evaluated during the driving maneuver by the open-loop and closed-loop control installation 14. Such an operating parameter in an exemplary manner is presently a variable which characterizes a drive torque of the drive 22. This operating parameter can be detected by means of a sensor or else be determined from other operating parameters of the drive 22.

If the braking effect is greater than intended, the drive torque of the drive 22 has to be correspondingly increased so as to achieve or maintain, respectively, a desired speed of the vehicle 10. The current variable characterizing the drive torque during the driving maneuver herein is continuously compared with a threshold value that is present or formed in the open-loop and closed-loop control installation 14. If the current variable characterizing the drive torque exceeds the threshold value, it is therefrom concluded that there is an unintentional and significant increase of the braking effect exerted on the rear wheels 26a and 26b by the parking brake 34. The parking brake 34 is consequently actuated by the open-loop and closed-loop control installation 14 such that the braking effect is reduced by a predefined measure.

Figure 2:
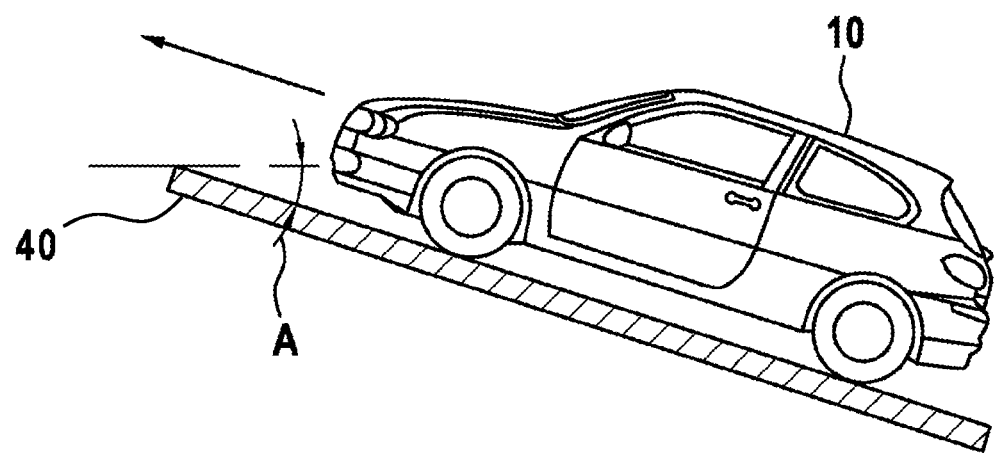
FIG. 2 shows a lateral view of a vehicle during a driving maneuver, the driving path of said vehicle having an uphill incline.

As can be seen from FIG. 2, it may however be the case that the vehicle 10 during the driving maneuver has to be moved along a driving path which has an incline. In a parking garage it can be the case, for example, that the vehicle 10 has to negotiate a ramp to a higher level. Such a ramp is provided with the reference sign 40 in FIG. 2. It can be seen that the ramp in relation to the horizontal encloses an angle A, thus has an incline. Accordingly, the vehicle 10 also has a longitudinal inclination corresponding to the angle A.

As can be readily understood, the drive 22 has to apply a higher drive torque when the vehicle 10 negotiates the ramp 40 than during a phase of the driving maneuver in which the vehicle 10 is moved horizontally. It is therefore possible for the mentioned threshold for the variable characterizing the drive torque of the drive 22 not to be configured as a rigid value. Instead, said threshold in this instance can be a function of the longitudinal inclination of the vehicle 10 determined by the inclination sensor 20.

It is additionally possible herein that the ratio between the variable characterizing the drive torque (for a standard drive torque which can move the vehicle 10 at a specific speed, for example) and the driving path, or the longitudinal inclination, respectively, of the vehicle 10 is determined at a point in time in the operation of the vehicle 10 at which it is ensured that no significant increase of the temperature of the parking brake 34 and thus no significant and unintentional increase of the braking effect has taken place yet. Such a point in time is, for example, the beginning of the driving maneuver, thus the beginning of the parking, for example.

This ratio can vary from the beginning of a driving maneuver up to the beginning of another driving maneuver, because the vehicle 10 can be dissimilarly loaded in different driving maneuvers, the parking brake 34 can have a different temperature by virtue of preceding operating states, or else, for example, brake pads of the parking brake 34 can have different coefficients of friction caused, for example, by fading, vitrification, contamination, etc.

The threshold for a specific incline, or the thresholds for specific inclines, respectively, is/are then defined as a function of the established ratio. This means nothing less than that the braking effect exerted by the parking brake 34 on the rear wheels 26a and 26b of the driven rear axle 24 is reduced only when the threshold does not correlate with the longitudinal inclination A of the vehicle 10 during the driving maneuver, wherein the correlation between the longitudinal inclination A and the characterizing variable is determined at the beginning of the driving maneuver.

Figure 3:
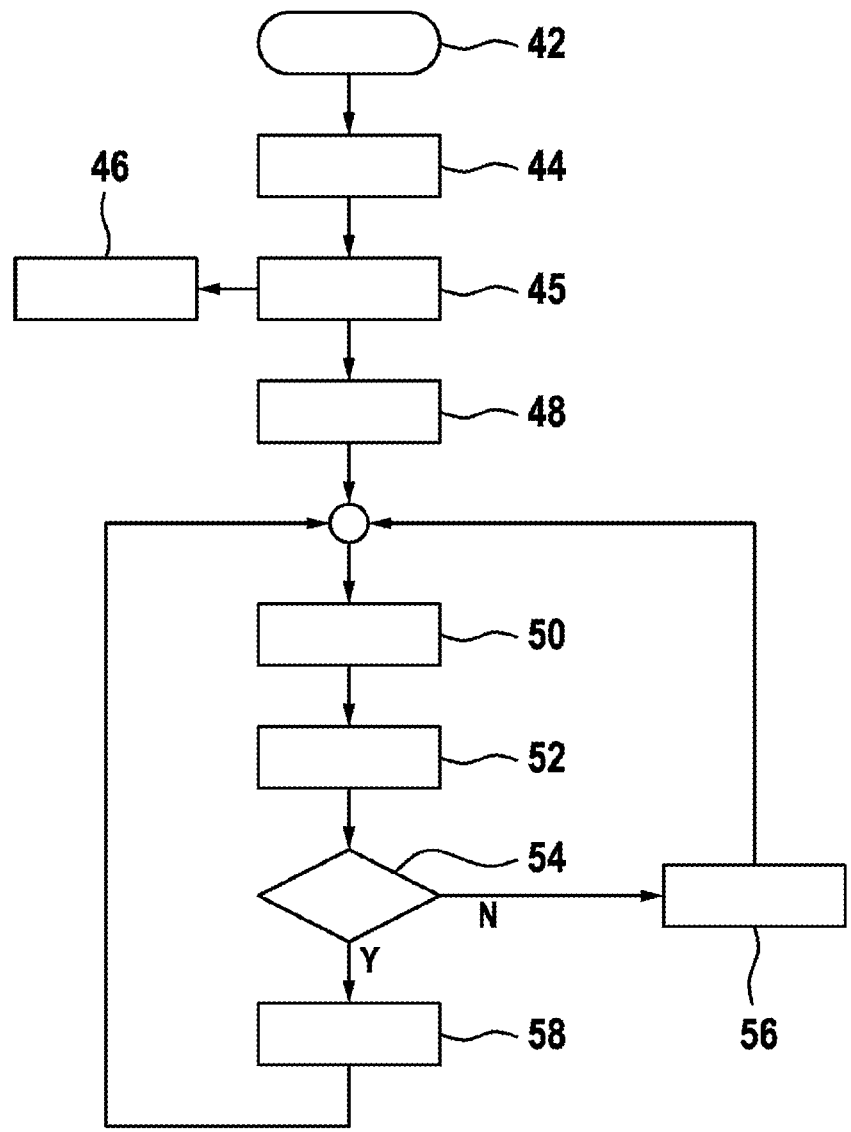
FIG. 3 shows a flowchart of a first method for assisting a driver, in which method a vehicle automatically carries out driving maneuver.

A corresponding method will now be explained with reference to FIG. 3. After a starting block 42, the vehicle 10 is initially stopped in a block 44, for example in order to allow the occupants in the vehicle 10 to alight. The desired driving maneuver, for example autonomous parking, is then started in a block 45. A desired braking effect by setting a specific clamping force of the parking brake 34 is set in a block 46. This braking effect during the driving maneuver (block 48) is at least initially exerted by the parking brake 34 on the rear wheels 26a and 26b such that the drive 22 has to move the vehicle 10 also counter to the effect of the parking brake 34.

The incline of the driving path is determined, for example by means of the inclination sensor 20, in a block 50. When the vehicle 10 is situated on the ramp 40 illustrated in FIG.

2, this incline corresponds to the angle A. A variable characterizing the current drive torque of the drive 22 is detected or determined, respectively, in a subsequent block 52. It is thereafter checked in a block 54 whether the current drive torque of the drive 22 corresponds to the determined incline having the angle A. To this end, the drive torque is compared with a threshold value which is a function of the longitudinal inclination A of the vehicle 10, as has been described above.

If the threshold value is not exceeded, it is established in a block 56 that the set clamping force, or the exerted braking effect, respectively, is maintained unchanged. If it is however established in the comparison block 54 that the drive torque exceeds the threshold value, the parking brake 34 in a block 58 is actuated by the open-loop and closed-loop control installation 14 such that the clamping force, or the braking effect, respectively, is reduced by a specific predefined value. A reset back to the block 50 takes place after the respective blocks 56 and 58.

Reference is now made to another embodiment by way of which a response can take place to an unintentional increase of the braking effect. Of course, this embodiment can be combined with the embodiment described above. In the case of this other embodiment, the wheel rotation speeds of the wheels of an axle are used as the operating parameter, presently, in an exemplary manner, the wheel rotation speeds of the rear wheels 26a and 26b of the rear axle 24 (the wheel rotation speeds of the front wheels 30a and 30b of the front axle 28 would be used if the parking brake 34 were to act at least also on said front wheels 30a and 30b).

A conclusion pertaining to an unintentional increase of the braking effect exerted on the rear wheels 26a and 26b by the parking brake 34 during an autonomous driving maneuver is made when a difference between the wheel rotation speeds of the two rear wheels 26a and 26b exceeds a threshold value. If this is established, the braking effect on that wheel that has a lower wheel rotation speed than the other wheel is partially (thus not completely) reduced. This reduction takes place gradually or continuously until it is established that the difference between the wheel rotation speeds undershoots a threshold value, thus is again at least substantially identical thereto.

Figure 4:
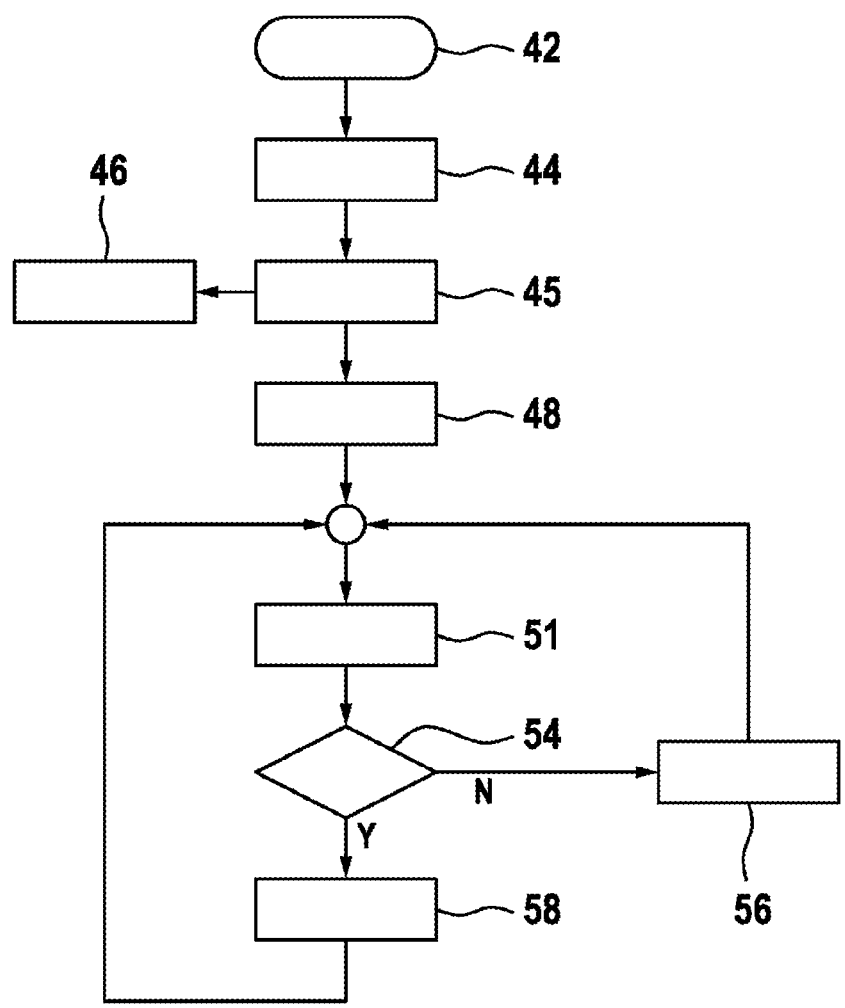
FIG. 4 shows a flowchart of a second method for assisting a driver, in which method a vehicle automatically carries out a driving maneuver.

The method just mentioned will now be explained with reference to FIG. 4. However, only that scope of said method which differs from the method described in FIG. 3 will be discussed herein. A block 51 in which the difference between the wheel rotation speeds of the two rear wheels 26a and 26b is determined is before the comparison block 54, and in the comparison block 54 it is then checked whether this difference is greater than the threshold value.

While not illustrated, it is however likewise possible for the parking brake to not act on the driven axle but on the wheels of the non-driven axle, presently, in an exemplary manner, thus on the wheels of the front axle. The variant just described can also be applied in this case. The unintentionally increased braking effect here also manifests itself by a higher level of slippage of the corresponding wheel and a correspondingly reduced rotation speed. In one potential design embodiment of this variant herein, the threshold value for the difference can be adapted as a function of a steering angle of the articulated front wheels. The threshold value can in particular be higher in the case of a larger steering angle than in the case of a smaller steering angle. Furthermore, the threshold value for the difference can be adapted as a function of the driving direction. In particular, the threshold value in a vehicle with front-wheel steering (as illustrated in FIG. 1) can be higher when reversing than when traveling forward.

While likewise not being illustrated, it is in principle of course also conceivable that the parking brake acts on all of the axles of the vehicle and the differences in the rotation speeds of all of the axles are evaluated.

The invention claimed is:

1. A method for assisting a driver, in which a vehicle automatically carries out a driving maneuver, comprising:
at least partially activating a parking brake such that the parking brake is at least partially activated while the driving maneuver is being carried out such that a braking effect is at least partially constantly exerted on at least one wheel of at least one axle during the driving maneuver;
operating a drive of the vehicle counter to the at least partially activated parking brake;
detecting at least one operating parameter which is associated with an unintentional increase of the braking effect exerted on the at least one wheel;
evaluating the detected at least one operating parameter during the driving maneuver; and
reducing the braking effect on the at least one wheel based on the evaluation, wherein:
the at least one operating parameter comprises wheel rotation speeds of the at least one wheel of at least one axle;
the braking effect on a first wheel of the at least one wheel that has a lower wheel rotation speed than a second of the at least one wheel is partially reduced in response to a difference between the wheel rotation speeds of the first and second wheels exceeding a threshold value; and
the threshold value for the difference is adapted as a function of a driving direction, such that, in a vehicle with front-wheel steering, the threshold value is higher when reversing than when traveling forward.

2. The method as claimed in claim 1, wherein:
the at least one operating parameter comprises a variable that characterizes a drive torque of the drive of the vehicle; and
reducing the braking effect on the at least one wheel includes reducing the braking effect on the at least one wheel when at least one of the variable characterizing the drive torque, and a variation of the variable characterizing the drive torque, exceeds a threshold.

3. The method as claimed in claim 2, wherein the braking effect is reduced only when exceeding the threshold does not correlate with a longitudinal inclination of the vehicle during the driving maneuver.

4. The method as claimed in claim 3, wherein the correlation between the longitudinal inclination and the at least one operating parameter is determined at the beginning of the driving maneuver.

5. The method as claimed in claim 1, wherein the at least one axle is a driven axle.

6. The method as claimed in claim 1, wherein the threshold value for the difference is adapted as a function of a steering angle, such that the threshold value increases as the steering angle increases.

7. The method as claimed in claim 1, wherein the braking effect is exerted on the wheels of a non-driven axle.

8. An open-loop and closed-loop control installation for a parking brake of a vehicle, comprising:
a memory having program instructions stored therein; and a processor operably connected to the memory and configured to execute the program instructions to:
- at least partially activate a parking brake while a driving maneuver is being carried out such that a braking effect is constantly exerted on at least one wheel of at least one axle of the vehicle during the driving maneuver;
- detect at least one operating parameter which is associated with an unintentional increase of the braking effect exerted on the at least one wheel when a drive of the vehicle is operated counter to the at least partially activated parking brake;
- evaluate the detected at least one operating parameter during the driving maneuver; and
- reduce the braking effect on the at least one wheel based on the evaluation, wherein:

the at least one operating parameter comprises wheel rotation speeds of the at least one wheel of at least one axle;

the braking effect on a first wheel of the at least one wheel that has a lower wheel rotation speed than a second of the at least one wheel is partially reduced in response to a difference between the wheel rotation speeds of the first and second wheels exceeding a threshold value; and the threshold value for the difference is adapted as a function of a driving direction, such that, in a vehicle with front-wheel steering, the threshold value is higher when reversing than when traveling forward.

* * * * *